May 10, 1932.  C. G. L. SJÖLANDER  1,857,338
MACHINE FOR WELDING TUBULAR OBJECTS
Filed May 22, 1929   6 Sheets-Sheet 1
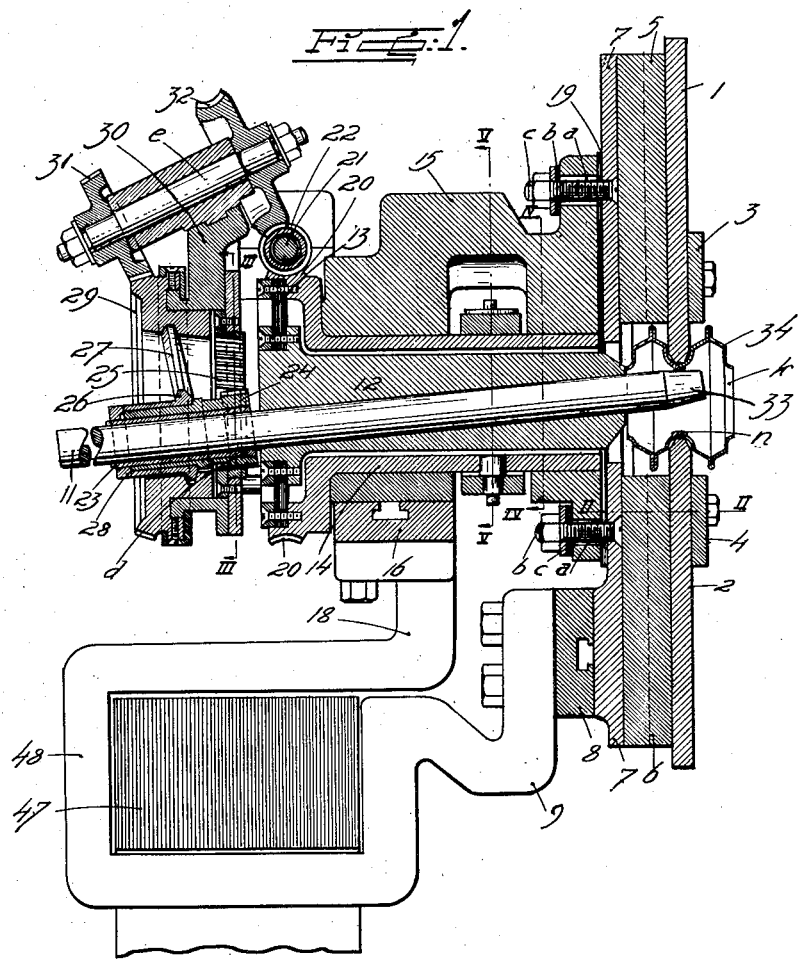
Inventor
Carl G. L. Sjölander
By H. B. Willson &co
Attorneys

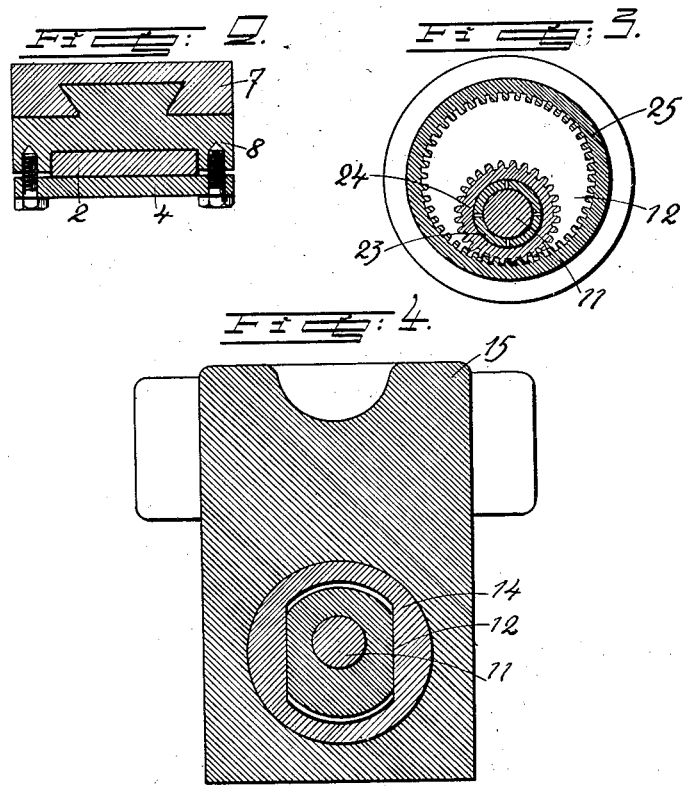
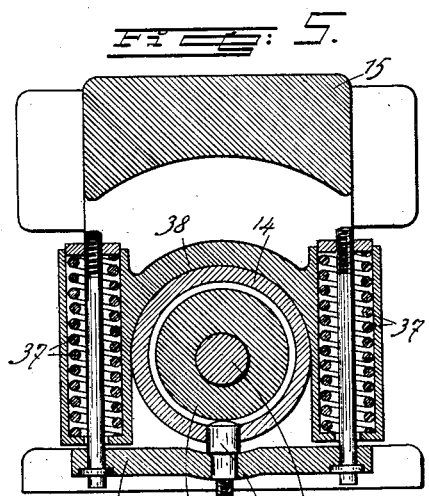

May 10, 1932.  C. G. L. SJÖLANDER  1,857,338
MACHINE FOR WELDING TUBULAR OBJECTS
Filed May 22, 1929   6 Sheets-Sheet 3
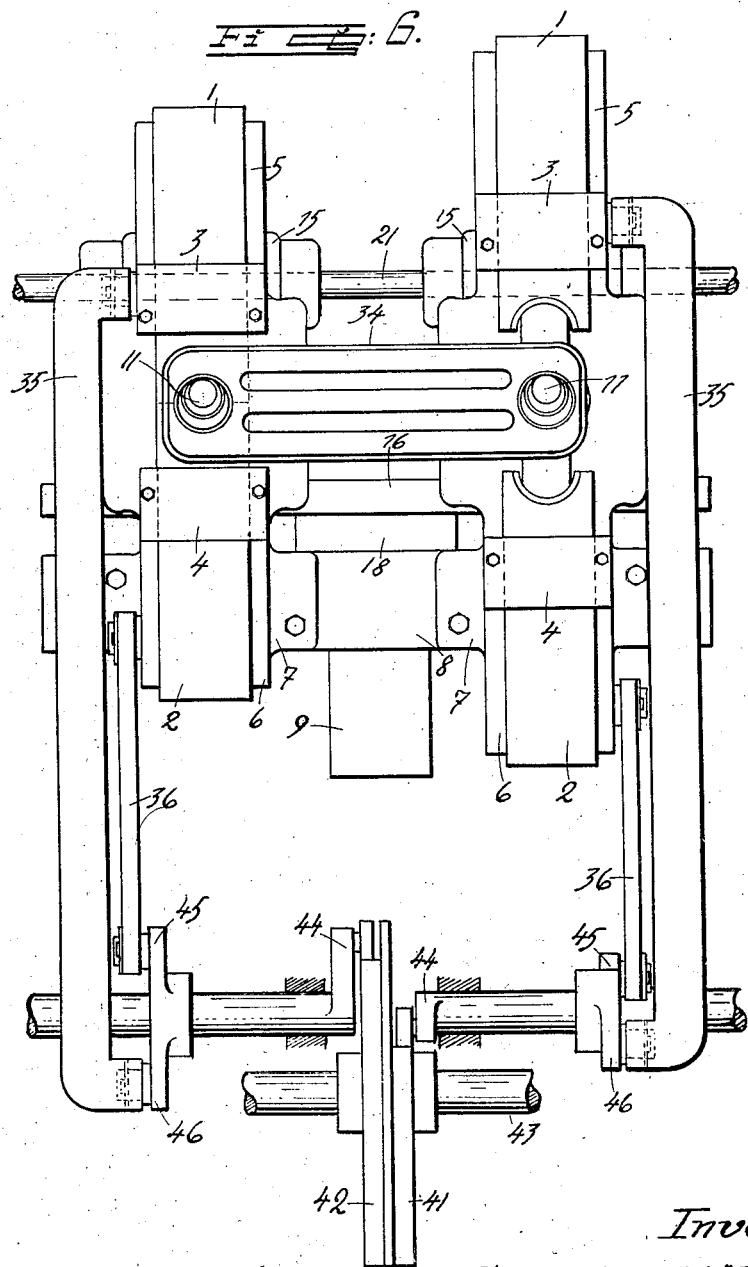
Inventor
Carl G. L. Sjölander
By H. B. Willson & Co
Attorneys

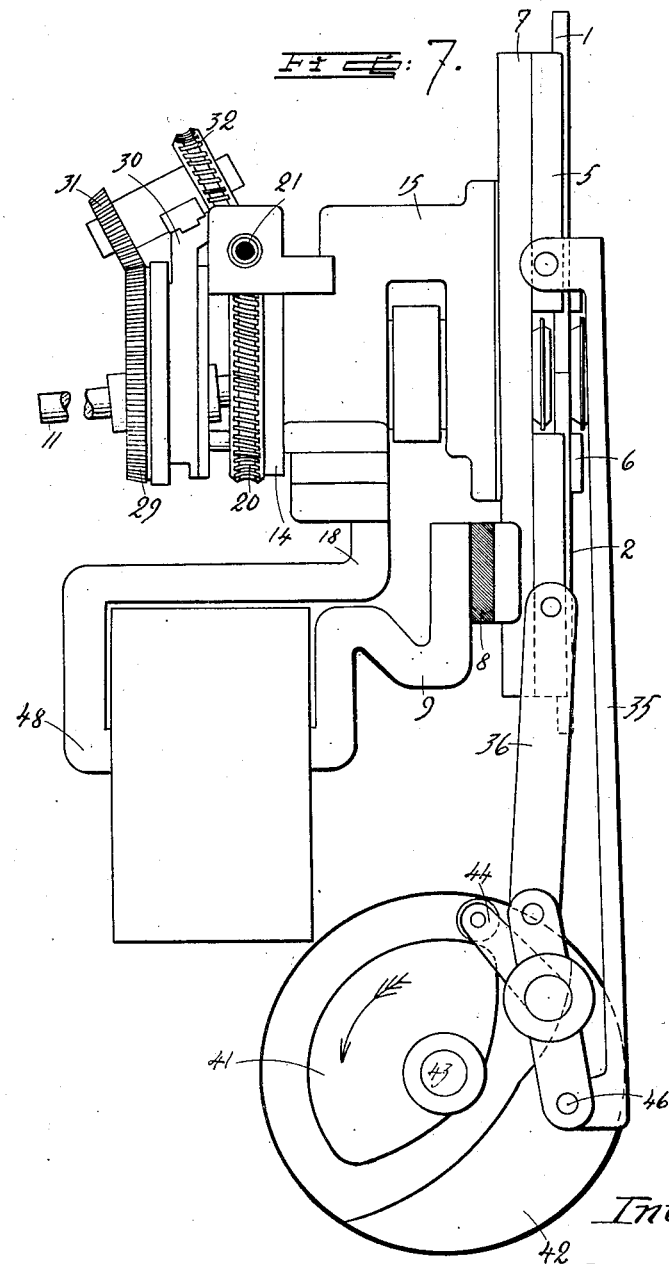

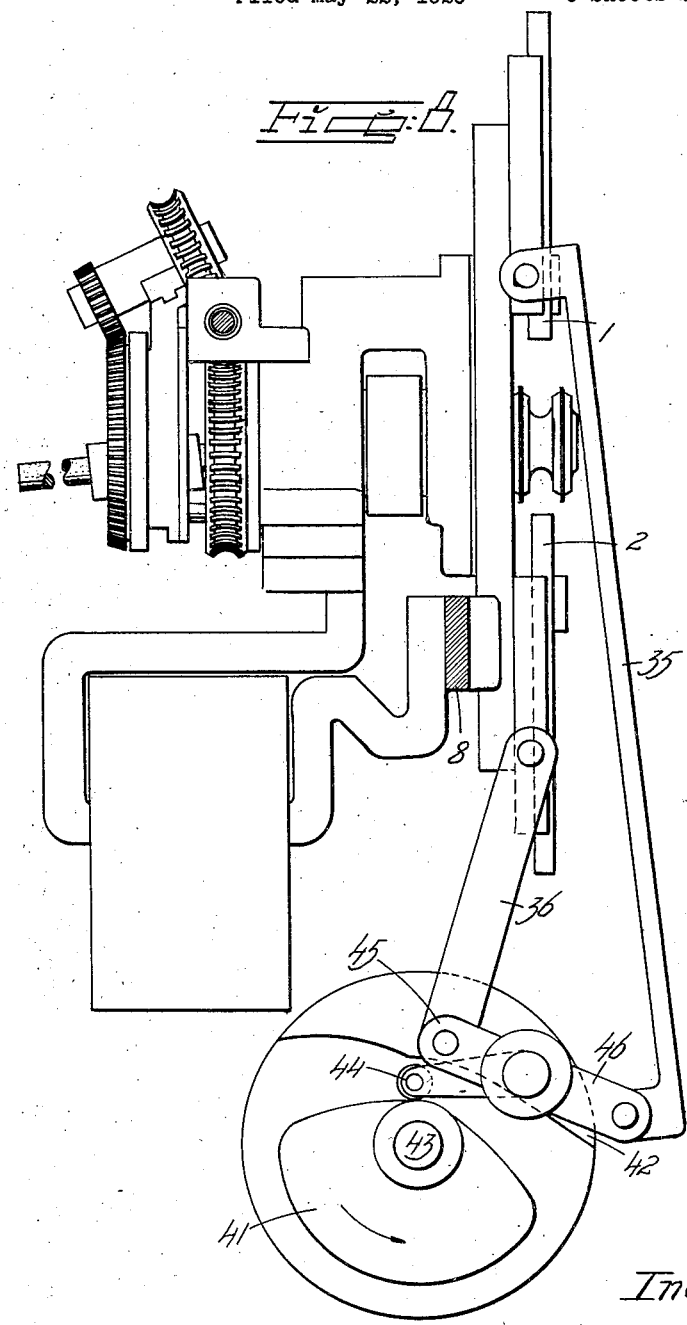

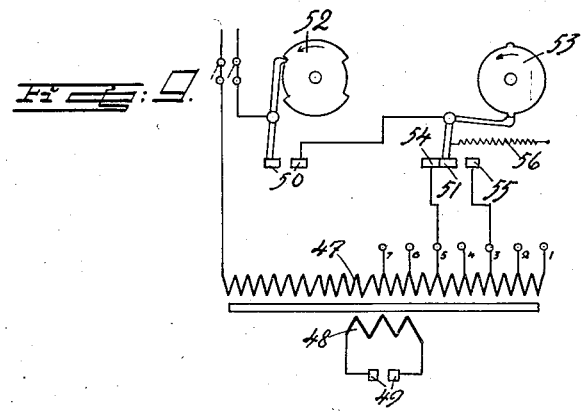
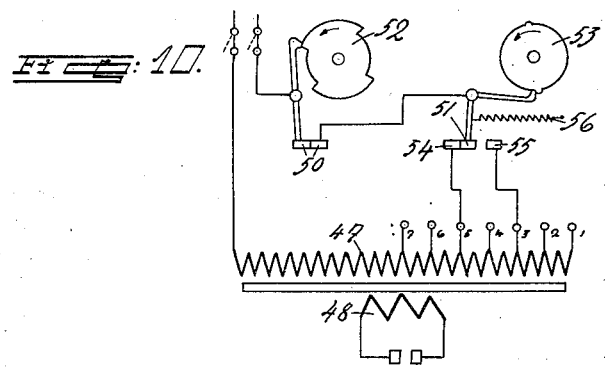
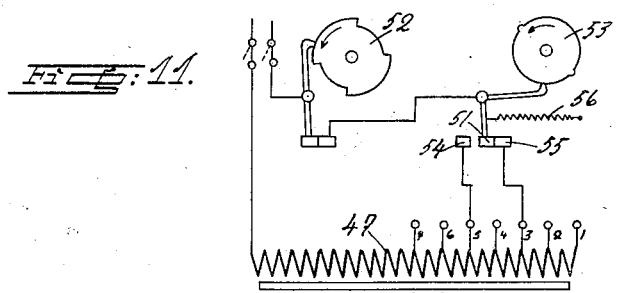

Patented May 10, 1932

1,857,338

UNITED STATES PATENT OFFICE

CARL GUSTAF LEONARD SJÖLANDER, OF DALSBORG, SWEDEN

MACHINE FOR WELDING TUBULAR OBJECTS

Application filed May 22, 1929, Serial No. 365,083, and in Sweden May 23, 1928.

This invention aims to provide an improved machine for joining tubular objects, for example radiator sections, more exactly necks of such sections, by means of resistance welding.

The invention is directed especially to keeping the electrical expenditure of energy low by means of suitable devices, and to giving the electrodes great durability, and to reducing the cost and the work with their maintenance to a minimum.

This is reached substantially by giving the inner electrode about the smallest diameter which its mechanical durability permits. Thus the contact area between the electrodes and the work becomes smaller, and consequently the resistance and the heat become greater at a smaller expenditure of energy. At the same time a smaller pressure can be used between the work and the electrodes, which in its turn has an advantageous influence especially upon the durability of the outer electrodes.

The inner electrode gains in strength and durability: (1) by being made of a solid copper-bar, (2) by being given a slow motion to-and-fro in axial direction during rolling against the inside of the tubular work, (3) by such proportioning that the electrode after a large number of revolutions, comes back to the same position which it had at a previous time, (4) by making provision whereby the part of the electrode that comes into contact with the work is conical instead of cylindrical. Due to these latter provisions, the electrode after having been used a certain time may be put in its original state by cutting off a piece of the conical part.

The invention is illustrated in the accompanying drawings, which show an embodiment of the welding-machine, which as usual is provided with a parted outer electrode which may be opened and closed.

Fig. 1 is a vertical section through a welding aggregate.

Fig. 2 is a section on line II—II of Fig. 1.
Fig. 3 is a section on line III—III of Fig. 1.
Fig. 4 is a section on line IV—IV of Fig. 1.
Fig. 5 is a section on line V—V of Fig. 1.
Fig. 6 is a front view of the machine with two welding aggregates, showing a radiator mounted in the machine, and the outer electrode closed in the one aggregate and open in the other.

Figs. 7, 8 are end views of the left weld aggregate with closed and open outer electrode, respectively.

Figs. 9, 10 and 11 are connecting diagrams for the weld transformer.

The machine contains two identical weld aggregates in order that the two necks of one section may be welded one immediately after the other without displacing the radiator. These aggregates may be connected to a common or to different transformers.

On account of the wear of the electrodes it is impracticable to keep the electrode groups identically equal, therefore it is important that the welding be not done at the same time in the two aggregates.

The two halves 1 and 2 of the outer electrode, Figs. 1, 6 and 7, are by means of clamps 3 and 4, Figs. 1 and 6, mounted on slides 5 and 6, Figs. 1 and 6, said slides being vertically movable on the part 7, Figs. 1 and 6, which part is connected by means of the bar 8, Figs. 1, 6 and 7, is connected with the one end 9 of the secondary winding 48, Fig. 1, of the weld transformer.

The inner electrode 11, Figs. 1, 3, 4, 5 and 6, which is cylindrical, is journalled with a certain inclination in a part 12, Figs. 1, 3, 4 and 5, which by means of a ring 13, Fig. 1, consisting of thin sheets of metal, is movably and electrically connected with the part 14, Figs. 1, 4 and 5. The part 14 is rotatably journalled in the frame part 15, Figs. 1, 4, 5 and 6. The part 15 is by means of the bar 16, Figs. 1, 6 and 7, electrically connected with the end 18, Figs. 1 and 6, of the secondary winding 48 of the transformer. The parts 7 and 15 are insulated from each other by insulation 19, Fig. 1, insulation tubes $a$ and insulation plates $b$ on the bolts $c$ with which the two parts are connected. The part 14 has at its one end a worm wheel 20, Fig. 1, which is driven by the worm 22 mounted on the shaft 21, Fig. 1. A sleeve, Figs. 1 and 3, which embodies a toothed wheel 24, is fixed on the inner electrode 11, Fig. 1, by means of a conical fixing sleeve 23 and a nut 28. Said toothed wheel 24 engages a stationary internally toothed ring 25, Figs. 1 and 3. On the sleeve of the toothed wheel 24 a roll 26 is rotatably journalled, Fig. 1, which engages a cam groove 27 of a toothed ring 29 which is rotatably journalled in a stationary part 30, Fig. 1. The ring 29 is connected with the worm 22, Fig. 1, by means of a toothed wheel 31, its shaft $c$ and the worm wheel 32, and said ring 29 is therefore driven by said worm 22.

The part 33 of the inner electrode 11 which comes into contact with the neck $n$, Figs. 1, 6 and 7, is conical, and the conicity and the inclination of the electrode in the part 12, Fig. 1, are such that the generatrix of the cone which is in contact with the neck is almost parallel with the axis of the part 14 and thus at right angles to the central planes of the radiator sections, which planes are transverse to the connection channels $k$. There exist, of course, small variations in the relative positions of the electrode end 33 and the radiator necks on account of wear and differences in the thickness of metal, but they are so small that they have no influence upon the quality of the weld.

The slides 5 and 6, Figs. 1 and 6, can by means of bars 35 and 36, Figs. 6 and 7, be moved up and down thus closing and opening each outer electrode. The bars 35 and 36 receive their motion from cam discs 41 and 42 on the shaft 43 by means of levers 44, 45, 46, Figs. 6, 7 and 8. The cam disc shaft 43 is by means of suitable gearing (not shown) connected with the shaft 21, Figs. 1, 6, 7 and 8.

The inner electrode 11 is pressed against the work by springs 37, Fig. 5, with the aid of hoops 38 and 39 and a pin 40, Figs. 1 and 5, which pin rests against the part 12. The latter has limited play within the part 14, Figs. 1, 4 and 5, so that it may oscillate a little vertically by deflection in the laminated sheet metal ring 13.

If two radiator sections 34 are to be welded together, the outer electrode is first closed about the section necks $n$, the one of which has been pushed into the other. Then the primary circuit 47 of the transformer is closed, and immediately after that the worm 22 is started, for instance by being in a known way connected to the shaft 21, Fig. 1, by means of a clutch-coupling. When the part 14 has made one turn, the coupling between the shaft 21 and the worm screw 22 is disconnected, after which the outer electrode opens and remains in the opened position. While the part 14 rotates, the centre of the conical part 33 of the inner electrode 11 describes a circle about the centre of the section necks $n$, while said conical part 33 rolls against the inside of the inner neck $n$. As has been already said this planetary movement has been known before. By choosing the number of the teeth in the toothed wheel 24 and the part 25 so that they stand to each other about as the diameter of the inner electrode to the inner diameter of the work, the rotation of the inner electrode relative to the work, takes place almost as a true rolling motion, but the friction between the inner electrode and the work becomes, of course, considerably smaller than with a rolling motion caused only by friction. On account of this the wear of the inner electrode becomes insignificant.

At the same time as the inner electrode rolls against the work it is moved axially on account of the engagement of the roll 26, Fig. 1, with the cam groove 27. The total distance of this movement is preferably about equal to the length of the conical part 33 of the inner electrode 11. In order that this axial movement shall not take place too quickly the part 29 should rotate with a speed a little deviating from the rotation speed of the part 14, i. e. a little slower or a little faster. The part 29 obtains, as has been mentioned above, its motion from the worm 22.

By the axial movement of the inner electrode the forming of grooves in the working surface of the electrode is avoided. The inner electrode is, however, gradually worn off. This wear having proceeded as far as can be practically allowed, a piece of the conical part of the inner electrode is cut off, and the electrode is moved forward a distance corresponding to the length of the cut-off piece, after the nut 28 has been loosened. The electrode is then fixed in its new position by tightening the nut 28.

By making the inner electrode long, the above-mentioned cutting-off and moving-forward may be repeated many times, and the same electrode may thus be used a long time. The possibility of utilizing the inner electrode to the utmost in the simple way mentioned is due to giving the electrode a conical working surface and journalling it obliquely in the part 12. By the oblique journalling one gains also the advantage, that the inner electrode clears that part of the radiator section neck, which faces the machine.

A further feature which contributes to making the inner electrode durable is so choosing the numbers of the teeth of the toothed wheel 24 and the ring 25 that they do not contain a factor common to both. Thus it takes longer before the same point of the inner electrode comes back to any one point at which it previously contacted with the work. If the ring 25 has 50 teeth and the toothed wheel 24, for instance, 29 teeth, and the ratio of gearing between the part 14 and the toothed ring 29 is 10:9 or 10:11, the part 14 must rotate $10 \times 29 = 290$ turns before the inner electrode has come back to the same point with respect to the work. Had the numbers of the teeth in the parts 25 and 29, on the contrary, been 50 and 30, 30 turns only would have been necessary. At a ratio of gearing of 10:9 or 10:11 between the parts 14 and 29 the inner electrode makes a whole double stroke axially while the part 14 makes 10 turns. If the same ratio of gearing were for instance 100:99 or 100:111, 100 turns of the part 14 would be necessary in order that the electrode should accomplish said double stroke. This ratio of gearing is not critical, but experiments, that have been made, have shown the ratio 10:9 to be a suitable ratio. It should be noticed, that the electrode should go neither too slow nor too fast. If it goes very slow, grooves are formed in the electrode, and the purpose of the axial movement is defeated. If it, on the contrary, goes too fast, the friction between the electrode and the work becomes so great that grooves are formed in the electrode in consequence thereof, and the quality of the weld is hazarded on account of stresses in the work.

In order that the machine shall be as easily managed as possible it is preferably provided with two identical welding aggregates, both substantially identical with the one described above. In order that the welding, however, shall take place with the greatest possible reliability and safety, it should not be done in the two aggregates at the same time, but in one immediately after the other so that the machine need not be started more than once for each radiator section to be welded to a previous section.

The machine is preferably arranged so that the outer electrode of the second aggregate closes immediately after the outer electrode of the first aggregate begins to open. When the welding of one section has been carried out, the outer electrodes in the two aggregates remain in the open position, so that the radiator may be removed and reinserted, together with a new section.

As the weld heat arises on account of the resistance of the iron, and as the resistance grows at increasing temperature, it has appeared, that if the same tension of the weld current is used at the start as well as at the continued welding of a section, the welding at the very start becomes not as good as during the continued welding, because the temperature at the start is not high enough. This depends partly on the fact, that the iron at the time for the start has lower temperature and consequently lower resistance, and partly on the fact, that the contact surfaces between the electrodes and the working piece at the start are not of the same form as after the start.

These factors co-operate to that point, that the weld heat becomes insufficient at the start, if the tension is not higher than that which is necessary for the continued welding. In order that the welding shall be of a reliable quality, the tension of the weld current is increased at the start as much as is necessary for a safe start welding, and is lowered to the tension which is suitable for the continued welding immediately after the start.

Figs. 9, 10 and 11 diagrammatically show means suitable for effecting the momentary alteration of the tension.

There are several contacts 1—7 in connection with the primary winding 47 of the transformer in order to make disconnection of a larger or smaller number of turns possible for the regulation of the secondary or weld tension. When welding, the secondary winding 48 is connected to the work over the electrodes 49. Two machine-driven contact devices 50 and 51, 54, 55 are arranged in the primary circuit. The object of the contact device 50 is to close the circuit at the start of the welding and to open it at the end of the welding. It is regulated by a slowly rotating cam disc 52, which during one revolution closes and opens the contact device 50 twice, once for each weld aggregate. Fig. 9 shows the position before the start. The contact part 51, influenced by the spring 56 and regulated by a second slowly rotating cam disc 53, is then in contact with the contact part 54, which at 5 is connected to the winding 47 in order to obtain a little higher secondary tension than the normal one.

At the start the position is the one shown in Fig. 10. Shortly after that the contact part 51 on account of the influence of the spring 56 strikes against the contact part 55, which at another point, for instance at 3, is connected to the winding 47, and normal secondary tension, which is suitable for the continued welding, is obtained. This position is shown in Fig. 11. The construction of the cam discs 52, 53 shown in the drawing presumes that they rotate synchronously.

The described details may, of course, be constructed in many other ways and the machine may be used for welding together articles other than radiator necks.

I claim:

1. In an electrical welding machine for circumferentially welding tubular objects, an electrode of less diameter than the internal diameter of the objects to be welded and adapted for reception within the latter, and means for imparting a reciprocating axial movement to said electrode and for simultaneously imparting a planetary movement thereto relative to the axis of the tubular objects.

2. In an electrical welding machine for joining tubular objects, a rolling inner electrode, means for rolling said electrode, means for giving said electrode a reciprocating axial movement during the welding operation in addition to its rolling movement along the inside of the work, current-conducting means embodying said electrode, and means for changing the tension of the current to impart higher tension thereto at the start of the welding operation than during the remainder of said operation, thereby insuring sufficient strength at the starting point of the weld.

3. In an electrical welding machine for joining tubular objects, a rolling inner electrode, means for rolling said electrode, and means for giving said electrode a reciprocating axial movement during the welding operation in addition to its rolling movement along the inside of the work; said inner electrode being journaled in an oblique position with respect to the center line of the tubular work, the part of said inner electrode which is adapted to contact with the work having a conical form in order to effectively engage the work.

4. In a welding machine for tubular bodies, a rotary driven member, an electrode extending through said member, and means embodying a pack of resilient sheet metal disks for establishing a driving connection between said member and said electrode.

5. In a welding machine for tubular bodies, an inner rotatable electrode, a rotatable member carrying said electrode, means for driving said rotatable carrying member, and additional means for rotating said electrode with respect to said rotatable carrying member.

6. In a welding machine for tubular bodies, a rotatable and slidable inner electrode, a rotatable member carrying said electrode, means for driving said rotatable carrying member, means for rotating said electrode with respect to said carrying member, a roll mounted on said electrode, and a relatively stationary cam track engaging said roll to impart a longitudinal to and fro movement to said electrode.

7. A structure as specified in claim 6; said cam track being of annular form and being rotatably mounted, and means for rotating said cam track at a speed different from the speed of said carrying member.

8. In a welding machine for tubular bodies, a rotatable sleeve and means for driving the same, a floating electrode-carrying member within said sleeve, a yieldable driving connection between said carrying member and said sleeve, and a spring-contracted yoke surrounding said sleeve, said yoke having a portion passing through said sleeve and abutting said carrying member to laterally urge the latter for the purpose of holding the electrode against the work.

9. In a welding machine, a pair of outer electrodes mounted for sliding toward and from each other, links extending from and connected with said electrodes, rock shafts having cranks to which said links are connected, said rock shafts having additional cranks provided with shoes, and rotary cams co-acting with said shoes for actuating said cranks, shafts and links to control said electrodes.

10. In a welding machine for tubular objects, a rotatable carrying member, an inner electrode having a conical work-engaging end, and means mounting said electrode on said carrying member in an oblique position and allowing longitudinal adjustment of said electrode with respect to said carrying member.

11. A structure as specified in claim 6; together with connecting means between said roll and said electrode allowing longitudinal adjustment of the latter through said roll.

In witness whereof I have hereunto signed my name.

CARL GUSTAF LEONARD SJÖLANDER.